United States Patent
Salot et al.

(10) Patent No.: US 9,712,685 B2
(45) Date of Patent: Jul. 18, 2017

(54) SYSTEMS, METHODS AND MEDIA FOR LOCATION REPORTING AT A CHARGING AREA LEVEL GRANULARITY

(71) Applicant: CISCO TECHNOLOGY, INC., San Jose, CA (US)

(72) Inventors: Nirav Salot, Pune (IN); Aeneas Dodd-Noble, Andover, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/081,454

(22) Filed: Mar. 25, 2016

(65) Prior Publication Data

US 2016/0212276 A1    Jul. 21, 2016

Related U.S. Application Data

(63) Continuation of application No. 14/634,175, filed on Feb. 27, 2015, now Pat. No. 9,300,165, which is a
(Continued)

(51) Int. Cl.
*H04M 11/00*  (2006.01)
*H04M 15/00*  (2006.01)
*H04W 4/24*   (2009.01)
*H04L 12/14*  (2006.01)
*H04W 60/00*  (2009.01)
*H02J 7/00*   (2006.01)
(Continued)

(52) U.S. Cl.
CPC ....... *H04M 15/8033* (2013.01); *H02J 7/0027* (2013.01); *H02J 7/025* (2013.01); *H04L 12/1407* (2013.01); *H04L 12/1485* (2013.01); *H04W 4/02* (2013.01); *H04W 4/24* (2013.01); *H04W 24/10* (2013.01); *H04W 60/00* (2013.01); *H04W 64/00* (2013.01)

(58) Field of Classification Search
USPC ....... 455/432.1, 433, 406, 456.3, 456.1, 418
See application file for complete search history.

(56) References Cited

U.S. PATENT DOCUMENTS 6,785,536 B1 * 8/2004 Lee .................. H04M 15/8033
                                                455/406
8,817,741 B2   8/2014 Shaheen
(Continued)

FOREIGN PATENT DOCUMENTS

EP          2202707 A1      6/2010

*Primary Examiner* — David Q Nguyen
(74) *Attorney, Agent, or Firm* — Patent Capital Group

(57) ABSTRACT

A method for location reporting at a charging area level granularity is provided. The method includes detecting at a mobility management entity (MME) a transition of a user equipment (UE) from a first cell to a second cell to obtain at least a second cell identifier. The method also includes determining at the MME whether the detected UE transition constitutes a transition from a first charging area to a second charging area using the second cell identifier by comparing the second cell identifier to a charging area configuration. A charging area includes a plurality of cells that are served by at least one eNodeB. The method further includes providing to a policy server a report of the determined UE transition, if it is determined that the detected UE transition constitutes a transition from the first charging area to the second charging area.

18 Claims, 8 Drawing Sheets

Related U.S. Application Data continuation of application No. 13/777,067, filed on Feb. 26, 2013, now Pat. No. 8,971,845.

(51) Int. Cl.
*H02J 7/02* (2016.01)
*H04W 4/02* (2009.01)
*H04W 24/10* (2009.01)
*H04W 64/00* (2009.01)

(56) References Cited

U.S. PATENT DOCUMENTS

| | | |
|---|---|---|
| 9,300,165 B2 | 3/2016 | Salot et al. |
| 2003/0119501 A1* | 6/2003 | Kim .................... H04W 24/02 455/433 |
| 2004/0224682 A1* | 11/2004 | Kang .................... A23B 7/02 455/433 |
| 2005/0060262 A1 | 3/2005 | Kunugi et al. |
| 2006/0014531 A1 | 1/2006 | Nam et al. |
| 2012/0063300 A1 | 3/2012 | Sahin et al. |
| 2012/0071173 A1 | 3/2012 | Olsson et al. |
| 2013/0053027 A1* | 2/2013 | Lau .................... H04W 76/022 455/432.1 |
| 2013/0102277 A1 | 4/2013 | Stenfelt et al. |
| 2013/0114404 A1 | 5/2013 | Yang |
| 2013/0210416 A1 | 8/2013 | Duan |
| 2013/0229946 A1 | 9/2013 | Wang et al. |
| 2013/0272197 A1 | 10/2013 | Avila Gonzalez et al. |
| 2014/0057660 A1* | 2/2014 | Wager .................... H04W 4/02 455/456.3 |
| 2014/0086052 A1 | 3/2014 | Cai et al. |
| 2015/0171661 A1 | 6/2015 | Salot et al. |

* cited by examiner

SYSTEMS, METHODS AND MEDIA FOR LOCATION REPORTING AT A CHARGING AREA LEVEL GRANULARITY

RELATED APPLICATION

This Application is a continuation (and claims the benefit of priority under 35 U.S.C. §120) of U.S. application Ser. No. 14/634,175, filed Feb. 27, 2015, entitled "SYSTEMS, METHODS AND MEDIA FOR LOCATION REPORTING AT A CHARGING AREA LEVEL GRANULARITY," Inventors Nirav Salot, et al., which is a continuation (and claims the benefit of priority under 35 U.S.C. §120) of U.S. application Ser. No. 13/777,067, filed Feb. 26, 2013, entitled "SYSTEMS, METHODS AND MEDIA FOR LOCATION REPORTING AT A CHARGING AREA LEVEL GRANULARITY." The disclosures of the prior applications are considered part of (and are incorporated by reference in) the disclosure of this application.

FIELD OF THE DISCLOSURE

This disclosure relates generally to systems, methods and media for location reporting at the level of charging areas that are defined and provisioned for common location-based services.

BACKGROUND

Wireless networks are telecommunication networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points.

Wireless communication technologies are used in connection with many user equipment, including, for example, satellite communications systems, portable digital assistants (PDAs), laptop computers, and mobile devices (e.g., cellular telephones). One benefit that users of such devices can obtain is the ability to connect to a network (e.g., the Internet) as long as the user is within range of such a wireless communication technology. Current wireless communication systems use either, or a combination of, circuit switching and packet switching in order to provide mobile data services to mobile devices. Generally speaking, with circuit-based approaches, wireless data is carried by a dedicated (and uninterrupted) connection between the sender and recipient of data using a physical switching path. Packet-based approaches, on the other hand, do not permanently assign transmission resources to a given session, and do not require the set-up and tear-down of physical connections between a sender and receiver of data. In general, a data flow in packet-based approaches is divided into separate segments of information or packets. The data flow may include a number of packets or a single packet.

DESCRIPTION OF EXAMPLE EMBODIMENTS

Overview

Figure 1:
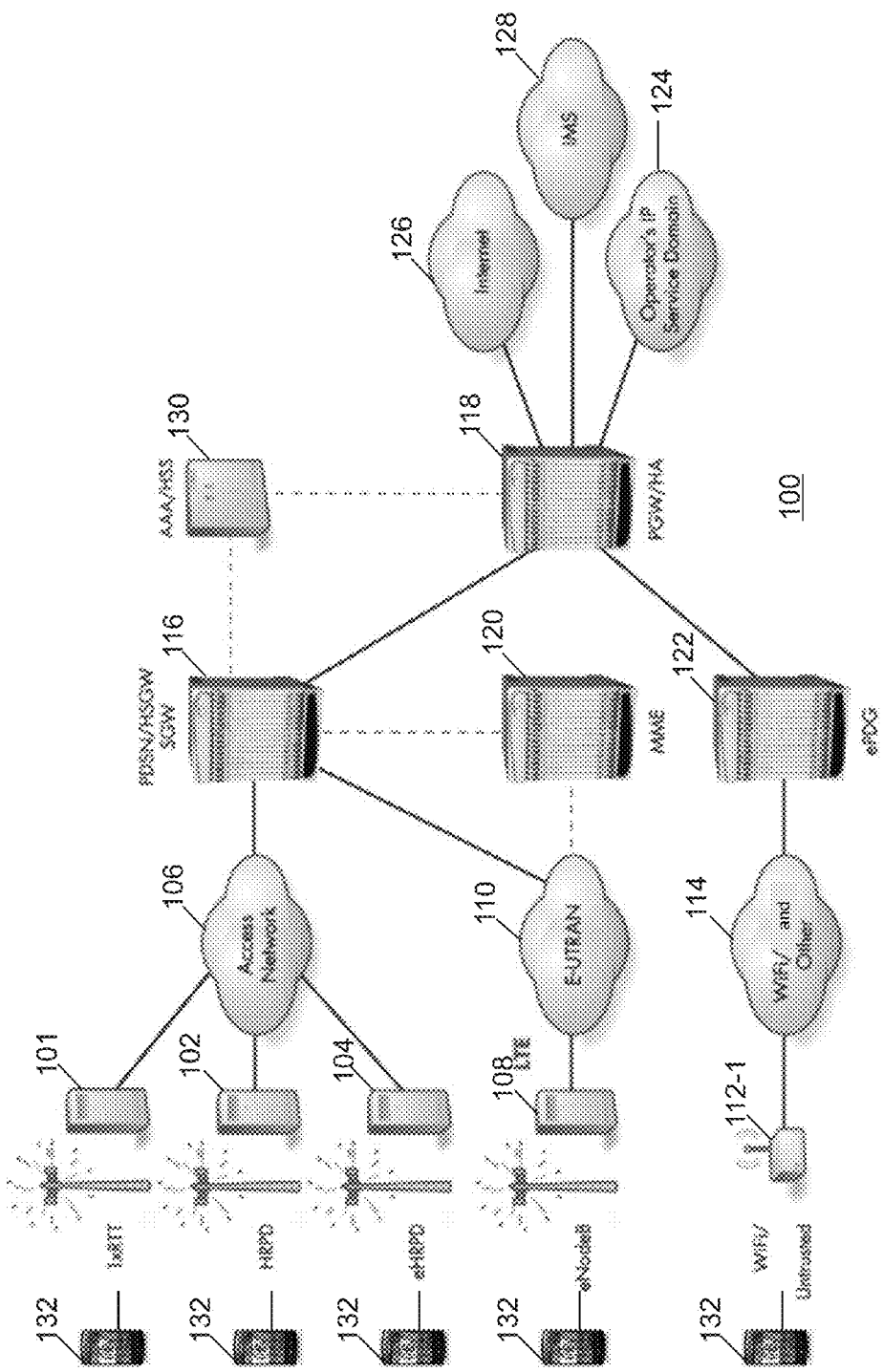
FIGS. 1-2 illustrate a communication network including a long term evolution (LTE) topology in accordance with certain embodiments.

Certain embodiments disclose a method that includes detecting at a control node a transition of a user equipment (UE) from a first cell to a second cell to obtain at least a second cell identifier. The method also includes determining at the control node whether the detected UE transition constitutes a transition from a first charging area to a second charging area using the second cell identifier by comparing the second cell identifier to a charging area configuration. A charging area includes a plurality of cells that are each served by at least one base station. In some embodiments, the plurality of cells are defined based at least in part on some commonality in location-based services and located within at least one tracking area, although the cells that make up the charging area could have no correlation with a tracking area or other service area defined by factors such as MME/SGSN capability, cell dimensioning, and other call-related parameters. If it is determined at the control node that the detected UE transition constitutes a transition from the first charging area to the second charging area, the method further includes providing from the control node a report of the determined UE transition from the first charging area to the second charging area to a policy server for a propagation of an updated location information of the UE including the determined UE transition.

The method further includes receiving input from a user, via an interface, for updating the charging area configuration. In some embodiments, updating the charging area configuration includes at least one of adding a set of cells forming a new charging area, removing a set of cells forming an existing charging area, adding at least one cell to a set of cells forming an existing charging area, and removing at least one cell from a set of cells forming an existing charging area.

In some embodiments, the charging area configuration is locally defined and stored at the control node. In some embodiments, the charging area configuration may include a plurality of sets of cells, wherein each set of cells defines a distinct charging area. In some embodiments, the control node may be a mobility management entity (MME), the base station may be an evolved node B (eNodeB) and the policy server may be a policy and charging rules function (PCRF). In some embodiments, the second cell identifier is compared to a first set of cells included in the charging area configuration that form the first charging area to determine whether the second cell is a part of the first set of cells. In some embodiments, a second set of cells in the charging area configuration that includes the second cell is identified, and next it is determined whether the second set of cells is different from a first set of cells forming the first charging area. In some embodiments, detecting a transition of a UE from the first cell to the second cell includes receiving a message including the second cell identifier from one of a first base station serving the first cell or a second base station serving the second cell.

Certain embodiments disclose a network device that includes a memory capable of storing data and a processor. The processor is configured for using the data such that the network device can detect a transition of a user equipment (UE) from a first cell to a second cell to obtain at least a second cell identifier and determine whether the detected UE transition constitutes a transition from a first charging area to a second charging area using the second cell identifier by comparing the second cell identifier to a charging area configuration. A charging area includes a plurality of cells that are each served by at least one base station. In some embodiments, the plurality of cells are defined based at least in part on some commonality in location-based services, and independent of a tracking area or routing area. If it is determined that the detected UE transition constitutes a transition from the first charging area to the second charging area, the processor is further configured for using the data such that the network device can provide to a policy server a report of the determined UE transition from the first charging area to the second charging area for a propagation of an updated location information of the UE including the determined UE transition.

Certain embodiment disclose a computer program product residing on a non-transitory computer-readable medium. The computer program product includes computer executable code which, when executed by one or more processors, causes the one or more processors to perform a method. The method includes detecting at a control node a transition of a user equipment (UE) from a first cell to a second cell to obtain at least a second cell identifier. The method also includes determining at the control node whether the detected UE transition constitutes a transition from a first charging area to a second charging area using the second cell identifier by comparing the second cell identifier to a charging area configuration. A charging area includes a plurality of cells that are each served by at least one base station. The plurality of cells are defined based at least in part on some commonality in location-based services, and independent of a tracking area or muting area. If it is determined at the control node that the detected UE transition constitutes a transition from the first charging area to the second charging area, the method further includes providing from the control node a report of the determined UE transition from the first charging area to the second charging area to a policy server for a propagation of an updated location information of the UE including the determined UE transition.

Example Embodiments

The disclosed systems, methods and media are provided for location reporting with a charging area level granularity. A charging area may be an area that is provisioned for common location based services. The location reporting at the charging area level provides a new level of location reporting granularity. For example, a charging area may include one or more cells that are served by at least one eNodeB/BSC, and the cells defining one or more charging areas may be a part of at least one tracking area. Charging areas may be locally configured in a mobility management entity (MME) and/or a serving GPRS support node (SGSN). Charging areas may not have to be defined on per user equipment (UE) basis. By defining charging areas, the network need not report every cell change for location services. Further, the charging areas are based at least in part on where there are common location services, without correlation to any tracking area used by the network.

FIG. 1 illustrates a communication system 100 with parallel networks in accordance with certain embodiments. FIG. 1 includes a number of radio access technologies such as a 1xRTT transceiver 101, a high-rate packet data (HRPD) transceiver 102, and an evolved high-rate packet data (eH-RPD) transceiver 104, each of which can connect to an access network 106. An Evolved Node B (eNodeB) transceiver 108 is an LTE network radio network component that connects to an Evolved UMTS Terrestrial Radio Access Network (E-UTRAN) 110. Other radio access technologies such as Wireless Local Area Network (i.e., Wi-Fi), WiMAX, or any other radio spectrum technology 114, can use a transceiver shown generally at 112-1 to connect a user equipment (UE) 132 to the network using a broadband or other access network.

The access network 106 can communicate with an access gateway 116 that implements a combination of functionalities such as a packet data serving node (PDSN), a HRPD serving gateway (HSGW), and a serving gateway (SGW). In operation, the PDSN functionality can be used with 1xRTT 100, the HSGW functionality can be used with HRPD 102 and eHRPD 104, and the SGW functionality can be used with the eNodeB 108. The access gateway 116 can communicate with an anchor gateway 118, which can implement a packet data network gateway (PGW) and a Home Agent (HA), and a mobility management entity (MME) 120. On the access network side, the anchor gateway 118 can also communicate with an evolved packet data gateway (ePDG) 122 that provides connectivity to the WLAN/other transceiver 112-1. On the packet core side, the anchor gateway can communicate with the operator's IP service domain 124, the Internet 126, and IP multimedia subsystem (IMS) 128. An authentication, authorization, and accounting (AAA) server/home subscriber server (HSS) 130 can communicate with the access gateway 116, the anchor gateway 118, or both.

The Home Subscriber Server (HSS) 130 can be a master user database that supports IMS network entities that handle calls. The HSS 130 stores subscription-related information (subscriber profiles), performs authentication and authorization of the user, and can provide information about the subscriber's location and IP information. The HSS 130 also maintains binding information on which gateway is currently serving a UE. Even when the UE 132 is detached from the network, the HSS 130 maintains the binding information until the UE 132 re-attaches itself and updates the binding information. The AAA server 130 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA/HSS 130 can communicate with the access gateway 116 for charging purposes.

The LTE communication network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communication network includes the MME 120, SGW 116 and PGW 118 components. In some embodiments, one or more EPC components can be implemented on the same gateway or chassis as described below.

The SGW 116 sits in the user plane where it forwards and routes packets to and from the eNodeB 108 and PGW 118. The SGW 116 also serves as the local mobility anchor for inter-eNodeB handover and mobility between 3GPP networks. The SGW 116 routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW 118). For idle state UEs 132, the SGW 116 terminates the down link data path and triggers paging when down link data arrives for the UE 132. The SGW 116 manages and stores UE contexts, e.g. parameters of the IP bearer service and network internal routing information. The SGW 116 also performs replication of the user traffic in case of lawful interception.

The PGW 118 acts as the interface between the LTE network and other packet data networks, such as the Internet 126 or SIP-based IMS networks 128 (fixed and mobile). The PGW 118 serves as the anchor point for intra-3GPP network mobility, as well as mobility between 3GPP and non-3GPP networks. The PGW 118 acts as the Policy and Charging Enforcement Function (PCEF), which manages Quality of Service (QoS), online/offline flow-based charging data generation, deep-packet inspection, and lawful intercept. The PGW 118 provides connectivity to the UE 132 to external packet data networks by being the point of exit and entry of traffic for the UE 132. A UE may have simultaneous connectivity with more than one PGW for accessing multiple packet data networks. The PGW 118 performs policy enforcement, packet filtering for each user, charging support, lawful interception, and packet screening. The PGW 118 also provides an anchor for mobility between 3GPP and non-3GPP technologies such as WiMAX and 3GPP2 standards (CDMA 1X and EVDO).

The MME 120 resides in the Evolved Packet Core (EPC) control plane and manages session states, authentication, paging, mobility with 3GPP 2G/3G nodes, roaming, and other bearer management functions. The MME 120 can be a standalone element or integrated with other EPC elements, including the SGW 116, PGW 118, and Release 8 Serving GPRS Support Node (SGSN). The MME 120 can also be integrated with 2G/3G elements, such as the SGSN and GGSN. This integration is the key to mobility and session management interworking between 2G/3G and 4G mobile networks.

The MME 120 is a control-node for the LTE access network. The MME 120 is responsible for UE tracking and paging procedures including retransmissions. The MME 120 handles the bearer activation/deactivation process and is also responsible for choosing the SGW 116 for a UE 132 at the initial attachment and at time of an intra-LTE handover as well as selecting an appropriate PGW (e.g., PGW 118). The MME 120 also authenticates the user by interacting with the HSS 130. The MME 120 also generates and allocates temporary identities to UEs 132 and terminates Network Access Server (NAS) signaling. The MME 120 checks the authorization of the UE 132 to camp on the service provider's Public Land Mobile Network (PLMN) and enforces UE roaming restrictions. The MME 120 is the termination point in the network for ciphering/integrity protection for NAS signaling and handles the security key management. Lawful interception of signaling is also supported by the MME 120. The MME 120 also provides the control plane function for mobility between LTE and 2G/3G access networks with the S3 interface terminating at the MME 120 from the SGSN (not shown). The MME 120 also terminates the S6a interface towards the home HSS 130 for roaming UEs 132.

Typically, the Evolved Node B (eNodeB) is statically configured with the Internet Protocol (IP) addresses of the S1 Application Part (S1AP) interface of one or more mobility management entities (MMEs). On power-up, the eNodeB establishes an S1AP connection to each configured MME's S1AP interface. For the selection of a particular MME during, e.g., International Mobile Subscriber Identity (IMSI)-based Initial Attach procedure, the eNodeB currently only considers the current load factor of the MMEs having an active S1AP connection —i.e., the current MME selection algorithm only takes into account the current load factor of the connected MMEs. The eNodeB simply assumes that all MMEs within an MME pool have the same capabilities/functionalities and thus does not allow selection of MMEs based on the service/communications session type requested by user equipment and the service/communications session type supported by the MMEs.

The ePDG 122 is responsible for interworking between the EPC and fixed untrusted non-3GPP access technologies such as a WLAN access networks. The ePDG 122 can use IPSec/IKEv2 to provide secure access to the EPC network. Optionally, the ePDG 122 can use Proxy Mobile IPv6 (PMIPv6) to interact with the PGW 118 when the mobile subscriber is roaming in an untrusted non-3GPP system. The ePDG 122 is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 2:
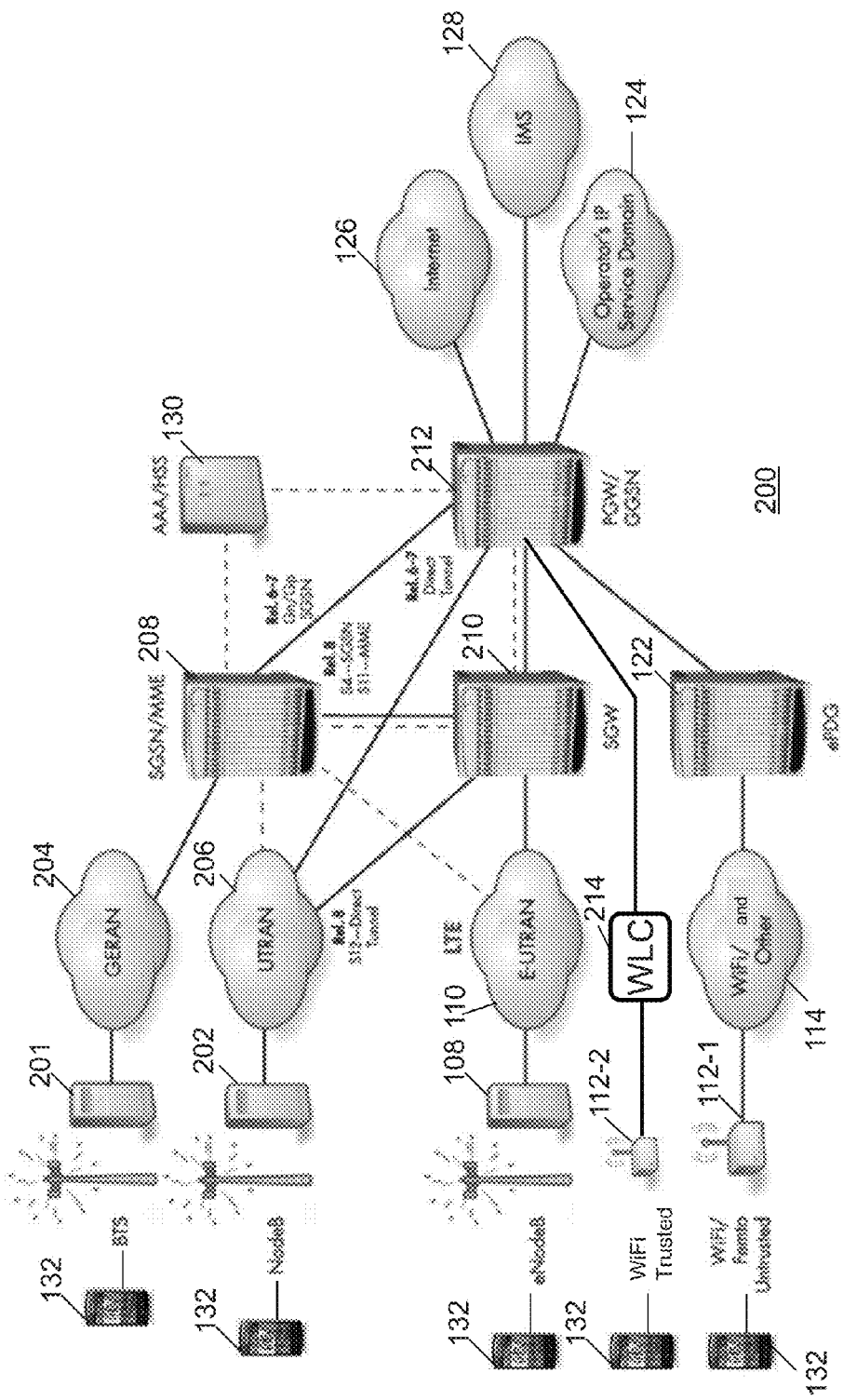

FIG. 2 illustrates a communication system 200 with parallel networks in accordance with legacy universal mobile telecommunications systems (UMTS) network devices in accordance with certain embodiments. The legacy transceivers include base transceiver station (BTS) 201 and NodeB transceiver 202. The BTS 201 can communicate with a GSM EDGE Radio Access Network (GERAN) 204 and the NodeB 202 can communicate with a UMTS terrestrial radio access network (UTRAN) 206. The serving GPRS support node (SGSN) can be implemented on a gateway 208 with a mobility management entity (MME). The GERAN 204 can communicate through the SGSN functionality on gateway 208 to serving gateway (SGW) 210 or gateway GPRS support node (GGSN)/PGW 212. UEs 132 can receive data service via a trusted WLAN network. The trusted WLAN can include an access point (AP) 112-2 and a WLAN controller (WLC) 214.

In some embodiments, the efficient mechanism for balancing data load across parallel communication networks can be implemented on gateways, such as PGW/HA 118, PDSN/HSGW/SGW 116, SGSN/MME 208, PGW/GGSN 212, or SGW 210. The gateways can access and maintain information relating to the communication session, the subscriber, the radio bearers, and the policies relating to the communication session. The gateways may be used to provide various services to a UE 132 and implement the quality of service (QoS) on packet flows. Several of these functions are used in providing, for example, voice over IP (VoIP) routing and enhanced services, such as enhanced charging, stateful firewalls, and traffic performance optimization (TPO). The communication networks also allow provision of applications such as VoIP, streaming video, streaming music, multi-user gaming, location based services, and a variety of delivered to a mobile node. Residing within the gateways can be one or more network processing units, line cards, as well as packet and voice processing cards.

The location of a user equipment (UE) often serves as an input for charging/billing controls and policy controls. For example, a subscriber may be billed at a different rate depending on whether the subscriber's device is used within the subscriber's home network or roaming outside the home network. In addition, location-based services (e.g., advertisement, location-based video, etc.) can be provided to the subscriber based on the current location of the subscriber, e.g., if the current location is known to a core network. The location reporting capability enables learning and updating the UE's current location. The location reporting may be performed at different granularity levels. For example, the location reporting may be performed with a cell level granularity, a tracking area (TA)/routing area (RA) level granularity or a charging area level granularity.

Figure 3:
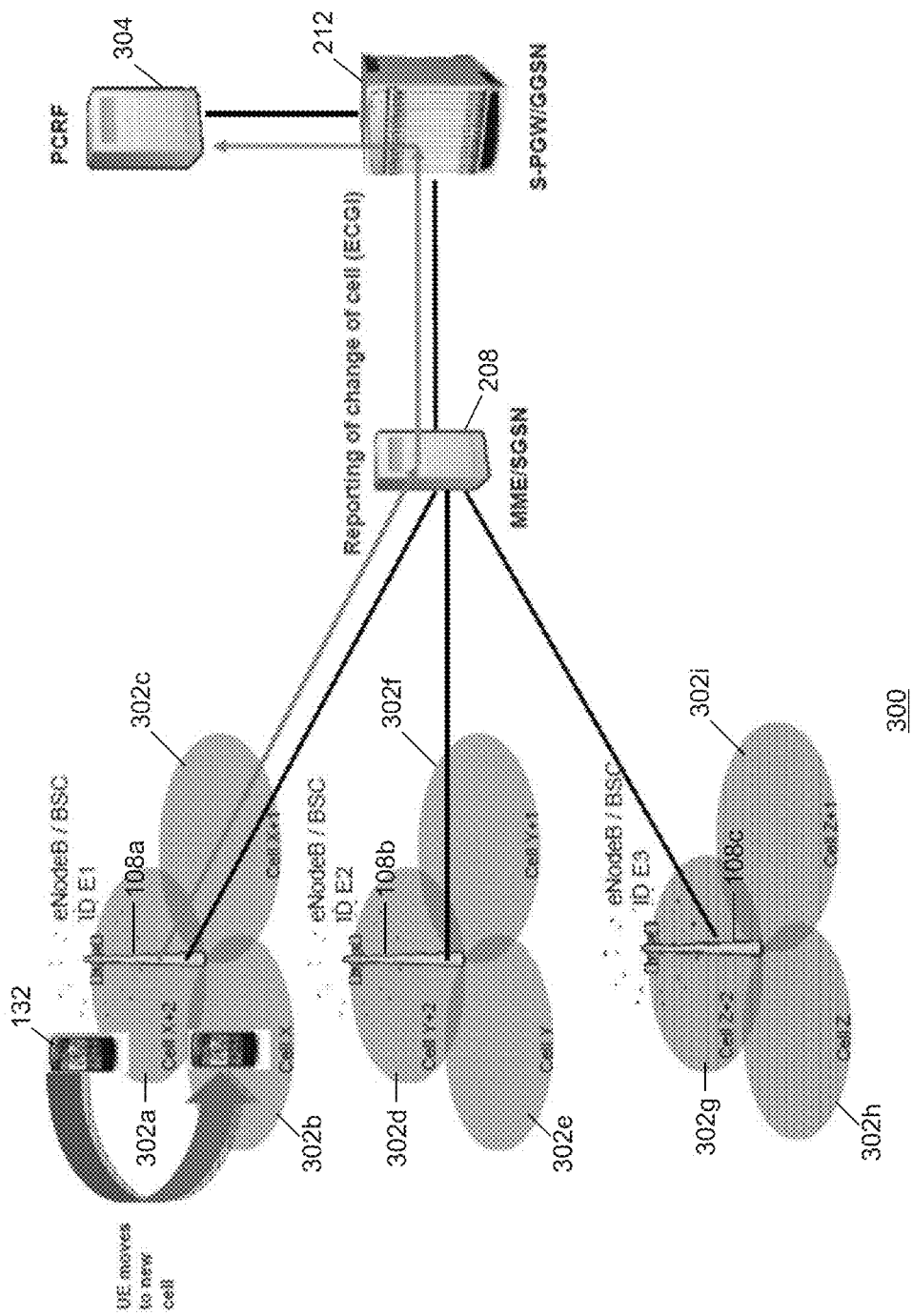
FIG. 3 shows a network diagram illustrating a location reporting with a cell level granularity in accordance with certain embodiments.

FIG. 3 shows a diagram of network 300 for illustrating a location reporting with a cell level granularity in accordance with certain embodiments. Network 300 includes a set of eNodeB/BSCs 108a-108c, each serving a plurality of cells 302a-302c, 302d-302f, 302g-302i, respectively, an MME/SGSN 208, a S-PGW/GGSN 212 and a policy and rules charging function (PCRF) 304. The location reporting at the cell level involves reporting every cell-to-cell transition of a user equipment (UE). When UE 132 transitions from one cell to another cell, for example, information related to the cell transition, including cell identification information, such as a cell global identifiers (CGI) or an enhanced cell global identifier (ECGI), is reported to PCRF 304 from eNodeB/BSC 108 serving UE 132 through MME/SGSN 208 and S-PGW/GGSN 212, as shown in FIG. 3. For instance, when UE 132 transitions from cell 302a to cell 302b, eNodeB 108a serving cell 302b may send a report of the cell transition including an identifier of cell 302b to PCRF 304 through MME 208 and SPGW 212.

When PCRF 304 receives the report, PCRF 304 may perform one or more tasks. For example, PCRF 304 may perform a test and recognize that UE 132 has gone out of its registered home network and may begin to apply a roaming charge for voice calls or data transmissions and/or receptions made by UE 132. PCRF 304 may also distribute the updated location information of UE 132 to, e.g., servers that provide location-based services. In some embodiments, when PCRF 304 receives the report, PCRF 304 determines whether UE 132 indeed has made a cell-to-cell transition using the information included in the report, including the cell 302b identifier.

If many subscriber UEs 132 are enabled for the location reporting with a cell level granularity, however, it is possible that the control plane signaling may cause the core network to be overloaded. The 3GPP standard, therefore, for example, recommends enabling the location reporting at the cell level only for a small subset of subscriber devices. In addition, reporting every cell-to-cell transition may not be very useful. This is because, e.g., location-based services, policy controls and charging/billing controls are generally not configured with a cell level granularity. Instead, common location-based services and charging/policy controls are generally configured for a larger area, such as a city or a part of a large city, that encompasses a number of adjacent cells. Therefore, reporting every cell transition is often unnecessary and causes a wasting of precious network bandwidths.

The location reporting could be performed with a tracking area (TA)/routing area (RA) level granularity. The location reporting at a TA/RA level granularity involves reporting every TA/RA transition. When UE 132 transitions from one tracking area to another tracking area, for example, identification information of new TA (e.g., tracking area identifier, or TAI) is reported to PCRF 304 from eNodeB/BSC 108 through MME/SGSN 208 and S-PGW/GGSN 212. When PCRF 304 receives the identification information, PCRF 304 may perform one or more tasks that may be required or desired after such a transition. In some embodiments, as in the location reporting at the cell level, PCRF 304 determines whether UE 132 indeed transitioned from one TA/RA to another TA/RA using the identification information when PCRF 304 receives the identification information.

The location reporting with a TA/RA level granularity does not incur as much signaling overhead compared to the location reporting with a cell level granularity. However, the location reporting at the TA/RA level would likely be less desirable than the charging area concept identified herein for location-based services and policy/charging controls. This difference arises because a tracking area or a routing area determination is often based on a function of cell dimensioning requirements, such as the optimum radio resource management, the MME/SGSN capacity, the density of the subscribers in particular areas, etc. For instance, a tracking area or a routing area is generally defined and fine-tuned based on a radio network planning and therefore, the location reporting at the TA/RA level is not suitable, e.g., for provisioning common location-based services. In other words, the boundary of a tracking area or a routing area is generally not aligned with the boundary of an area that is considered for common location-based services.

Figure 4:
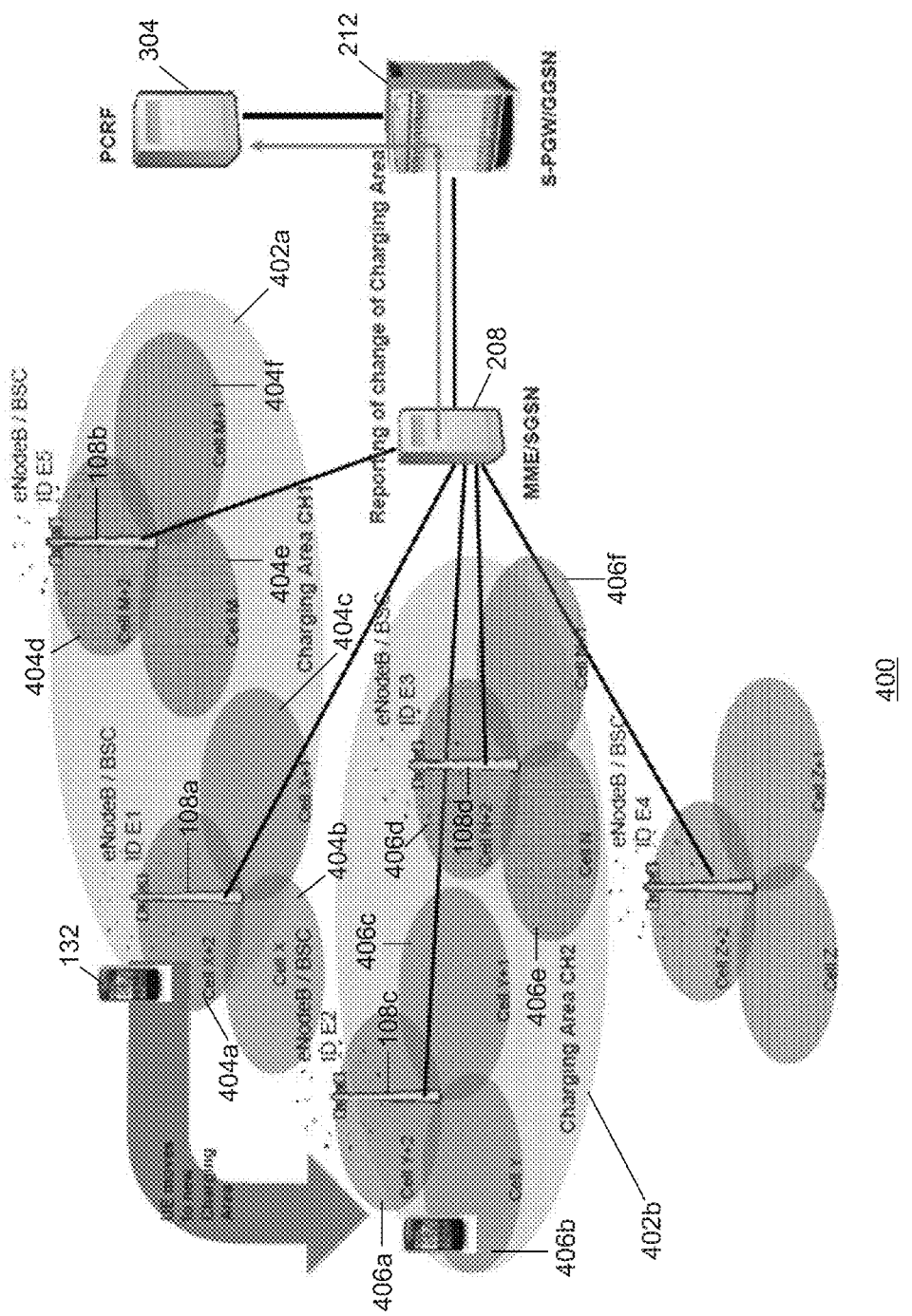
FIG. 4 shows a network diagram illustrating a location reporting with a charging area level granularity in accordance with certain embodiments.

FIG. 4 shows a diagram of network 400 for illustrating a location reporting with a charging area level granularity in accordance with certain embodiments. A charging area is an area where common location-based services may be provisioned. In some embodiments, a charging area is defined and provisioned for common location-based services based largely on factors related to common location-based services and independent of, e.g., cell dimensioning aspects. In some embodiments, a charging area is mapped to a plurality of cells that may be served by a group of one or more adjacent eNodeB/BSCs. In a densely populated area, for instance, areas/cells served by several eNodeB/RNCs may form single charging area. In a sparsely populated area, where each eNodeB/BSC serves a larger physical area, areas/cells served by only a few eNodeB/BSCs may form single charging area. In some embodiments, a charging area configuration includes a plurality of sets of cells where each set of cells defines a distinct charging area.

Referring to FIG. 4, network 400 includes a plurality of charging areas 402a, 402b, an MME/SGSN 208, an S-PGW/GGSN 212 and a PCRF 304. Charging area 402a includes cells 404a-404c that are served by eNodeB 108a as well as cells 404d-404f that are served by eNodeB 108b. Charging area 402b includes cells 406a-406c that are served by eNodeB 108c as well as cells 406d-406f that are served by eNodeB 108d.

The location reporting at the charging area level involves reporting charging area transitions. When UE 132 transitions from one cell to another cell, for example, MME/SGSN 208 receives a notification including information about the cell transition. Using the information about the cell transition, MME/SGSN 208 determines whether UE 132 has transitioned from one charging area into another charging area. In some embodiments, for example, the information includes an identifier of the destination cell to which UE 132 transitioned. In some embodiments, MME/SGSN 208 compares the destination cell identifier to a charging area configuration locally stored at MME/SGSN 208. For instance, MME/SGSN 208 may compare the destination cell identifier to a set of cells defining an originating charging area to determine whether UE 132 transitioned to another charging area. MME/SGSN 208 may also identify a set of cells that includes the destination cell and determine whether the identified set of cells is different form the set of cells defining the origination charging area.

If MME/SGSN 208 determines that UE 132 indeed transitioned to another charging area, MME/SGSN 208 reports the charging area transition to PCRF 304 through S-PGW/GGSN 212. In some embodiments, PCRF 304 may distribute an updated location information of UE 132 to, e.g., servers that provide location-based services.

Figure 5:
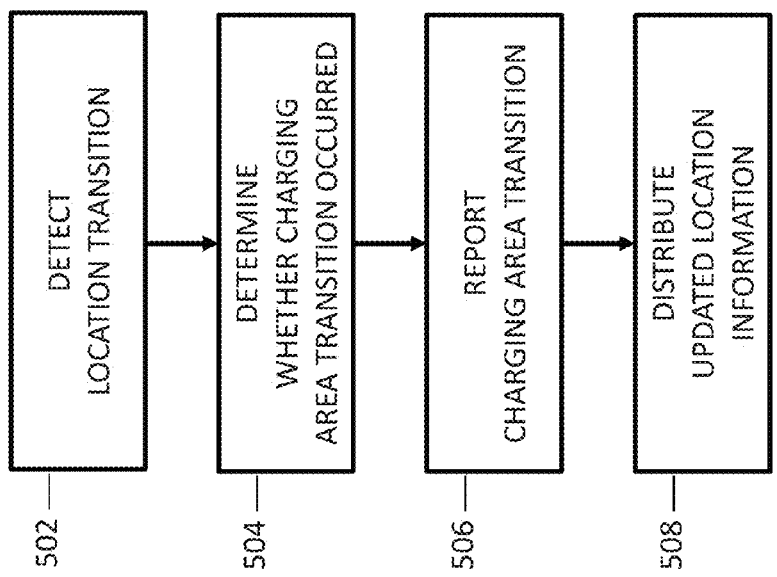
FIG. 5 shows a flow diagram for location reporting with a charging area level granularity in accordance with certain embodiments.

FIG. 5 shows a flow diagram 500 for a location reporting with a charging area level granularity in accordance with certain embodiments. At 502, a location transition of UE 132 is detected. In some embodiments, MME/SGSN 208 is configured to detect a location transition of UE 132. When UE 132 transitions from one cell (404a) to another cell (406b), as illustrated in FIG. 4, for example, MME/SGSN 208 detects the location transition and obtains information related to the location transition, including an identifier of the destination cell (406b).

At 504, it is determined whether a user equipment transitioned from one charging area to another charging area using the location transition information obtained at 502. MME/SGSN 208 can, for example, determine whether UE 132 transitioned from one charging area (402a) to another charging area (402b), as illustrated in FIG. 4, by comparing the originating cell (404a) identifier and/or the destination cell (406b) identifier to the local charging area configuration. For instance, MME/SGSN 208 may compare the destination (404b) cell identifier to the set of cells (404a-404f) defining the originating charging area (402a) to determine whether UE 132 transitioned out of the originating charging area and into another charging area. MME/SGSN 208 may also identify a set of cells that includes the destination cell (404b) and determine whether the identified set of cells (406a-406f) is different from the set of cells (404a-404f) defining the originating charging area (402a).

In some embodiments, MME/SGSN 208 is locally configured with a charging area configuration. For example, MME/SGSN 208 can be locally configured with a plurality of sets of cells that are served by a group of one or more eNodeB/BSCs, where each set of cells defines a distinct charging area. Referring to FIG. 4, for instance, MME/SGSN 208 is locally configured with cells 404a-404f, which together define charging area 402a, and cells 406a-406f, which together define charging areas 402b. Cells 404a-404c, 404d-404f, 406a-406c and 406d-406f are served by eNodeB 108a-108d, respectively. In those embodiments where charging areas are locally configured, e.g., at MME/SGSN 208, eNodeBs in communication with MME/SGSN 208 may not be aware of the existence of the charging areas.

In some embodiments, MME/SGSN 208 provides a user interface for a user (e.g., a user with administrative privilege) to update the local charging area configuration. For example, a network administrator may decide to adjust the coverage of charging area 402b by removing cell 406e from the set of cells that define charging area 402b at MME/SGSN 208. The network administrator may also decide to remove a cell (e.g., 404e or 404f) from the set of cells defining charging area 402a. The network administrator may further decide to delete charging areas 402a-402b by removing cells 404a-404f and 406a-406f from the charging area configuration and may decide instead to add a new charging area using a different set of cells (e.g., 404a-c and 406a-406c).

In some embodiments, MME/SGSN 208 stores the charging area configuration in a local database table. In some embodiments, a charging area is as small as an area including few cells that are covered by single eNodeB.

If it is determined at 504 that the user equipment has transitioned from one charging area to another charging area, the detected charging area transition is reported at 506. In some embodiments, MME/SGSN 208 reports the detected charging area transition to PCRF 304 through S-PGW/GGSN 212.

At 508, an updated location information with a charging area granularity is made available for distribution at PCRF 304. In some embodiments, the updated location information is distributed to application servers that provide location-based services. In some embodiments, the updated location information is combined with requests for location-based services before the requests are transmitted to the servers that provide the requested location-based services.

The location reporting at a charging area level granularity provides for an efficient management of the network/bandwidth resources e.g., by reducing the signaling traffic to and from a core network. The location reporting at the charging area level also provides for an optimization of the utility of the location change/update reporting. It may also require little or no changes/updates on the part of the user or network equipment. In addition, because charging areas can be configured locally at, e.g., an MME/SGSN, they may be readily generated, managed, maintained and updated.

User Equipment and Network Device

Figure 6:
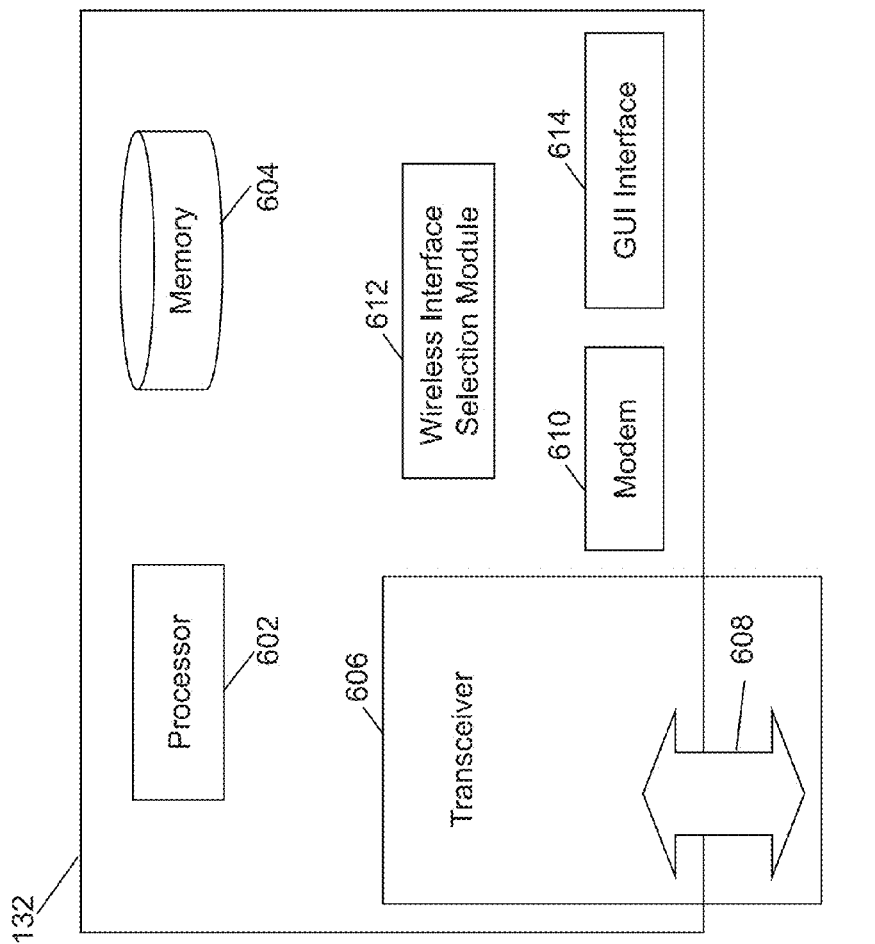
FIG. 6 shows a logical diagram of a user equipment in accordance with certain embodiments.

FIG. 6 illustrates a logical view 600 of user equipment (UE) 132 in accordance with certain embodiments. The UE 132 can include a processor 602, a memory 604, a transceiver 606 including an interface 608, a modem 610, a wireless interface selection module 612, and a GUI interface 614.

The transceiver 606 includes a transmitter and a receiver. The transmitter and the receiver can be integrated into a single chip or can be embodied in separate chips. The transceiver 606 can also include an interface 608 that provides an input and/or output mechanism to communicate with other network devices. The interface 608 can measure the wireless signal strengths of wireless interfaces such as base stations and access points. The interface 608 can be implemented in hardware to send and receive signals in a variety of mediums, such as optical, copper, and wireless, and in a number of different protocols some of which may be non-transient.

The modem 610 is configured to implement modulation and framing of signals according to one or more communication standards. The communication standards include the cellular standards defined under 3GPP.

The wireless interface selection module 612 is configured to select a wireless interface from which to receive network services. The wireless interfaces can include interfaces to different types of communication networks, including cellular networks and WLANs. Cellular networks can include LTE networks. A wireless interface for LTE networks can include a base station such as an eNodeB; a wireless interface for WLANs can include an access point.

The wireless interface selection module 612 can select the serving wireless interface by analyzing data load information associated with wireless interfaces. In certain embodiments, the wireless interface selection module 612 can be configured to attach to a wireless interface handling the least amount of data traffic and/or with more available resources. In certain embodiments, the wireless interface selection module 612 can also analyze additional information to decide to which wireless interface to connect. For example, the wireless interface selection module 612 can use one or more of the following: the load condition associated with the candidate wireless interfaces, the wireless signal strength associated with the candidate wireless interfaces, and a configuration status on the wireless interface selection module 612 indicating whether the UE 132 favors the cellular network or the WLAN.

The wireless interface selection module 612 can be implemented in software using memory 604 such as a non-transitory computer readable medium, a programmable read only memory (PROM), or flash memory. The software can run on a processor 602 that executes instructions or computer code. The wireless interface selection module 612 may also be implemented in hardware using an application specific integrated circuit (ASIC), programmable logic array (PLA), or any other integrated circuit.

The GUI interface 614 can provide communication with an input and/or output mechanism to communicate with UE users. UE users can use input/output devices to send/receive data to/from the UE 132 over the GUI interface 614. Input/output devices can include, but are not limited to, a keyboard, a screen, a touch screen, a monitor, and a mouse. The GUI interface 614 can operate under a number of different protocols. The GUI interface 614 can be implemented in hardware to send and receive signals in a variety of mediums, such as optical, copper, and wireless.

The UE 132 described above can communicate with a plurality of radio access networks using a plurality of access technologies and with wired communication networks. The UE 132 can be a smart phone offering advanced features and capabilities, such as word processing, web browsing, gaming, e-book capabilities, an operating system, and a full keyboard. The UE 132 may run an operating system such as Symbian OS, iPhone OS, RIM's Blackberry, Windows Mobile, Linux, Palm WebOS, and Android. The screen may be a touch screen that can be used to input data to the UE 132 and the touch screen can be used instead of the full keyboard. The UE 132 may have the capability to run applications or communicate with applications that are provided by servers in the communication network. The UE 132 can receive updates and other information from these applications on the network.

The UE 132 also encompasses many other devices such as televisions (TVs), video projectors, set-top boxes or set-top units, digital video recorders (DVR), computers, netbooks, laptops, and any other audio/visual equipment that can communicate with a network. The UE 132 can also keep global positioning coordinates, profile information, or other location information in its stack or memory. The UE 132 can have a memory such as a computer readable medium, flash memory, a magnetic disk drive, an optical drive, a programmable read-only memory (PROM), and/or a read-only memory (ROM). The UE 132 can be configured with one or more processors 602 that process instructions and run software that may be stored in memory 604. The processor 602 can also communicate with the memory 604 and interfaces to communicate with other devices. The processor 602 can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The UE 132 can also provide a variety of user interfaces (e.g., GUI Interface 614) such as a keyboard, a touch screen, a trackball, a touch pad, and/or a mouse. The UE 132 may also include speakers and a display device in some embodiments.

The interworking between a cellular network and a WLAN can be implemented, at least in part, in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA). The CVR scheme can be implemented on network devices of the same type, implementing the same set of functionalities.

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintaining traffic management for the mobile node. The offload gateway can be implemented as any combination of the following including an xGSN, an xGW, an xGW-SGW, and an xGW-PGW.

Figure 7:
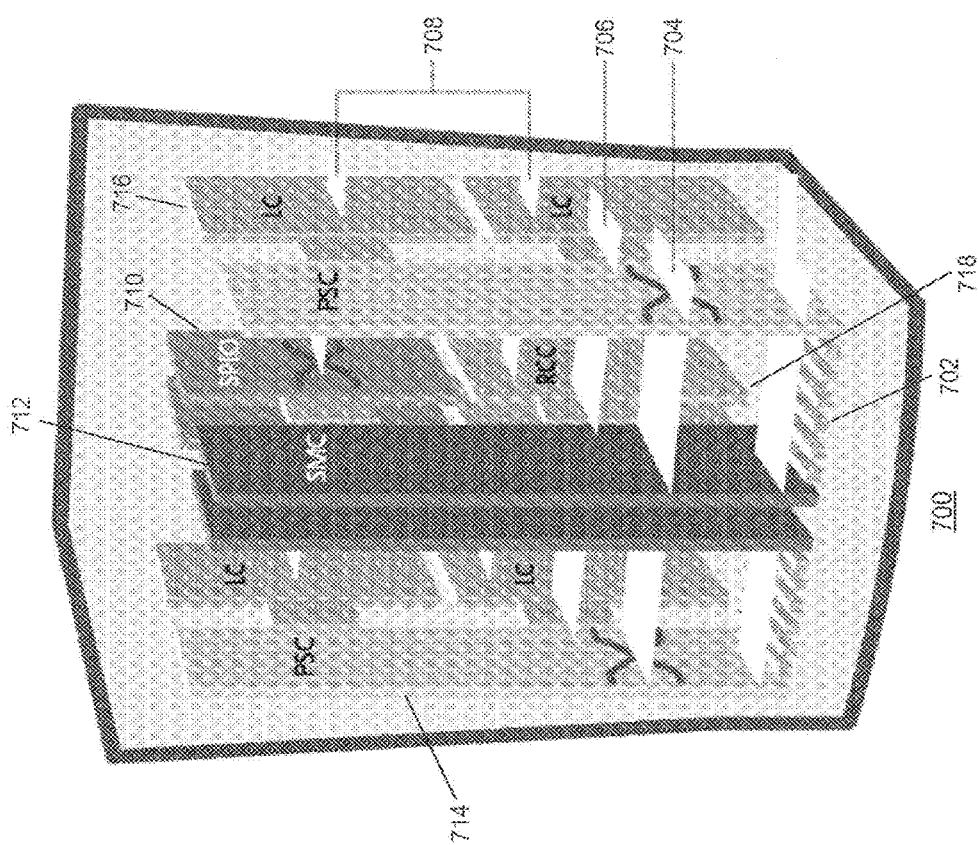
FIG. 7 illustrates a network device in accordance with certain embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 7 illustrates the implementation of a network device 700 in accordance with some embodiments. The network device 700 includes slots 702 for loading application cards and line cards. A midplane can be used in the network device 700 to provide intra-network device communications, power connections, and transport paths between the various installed cards. The midplane can include buses such as a switch fabric 704, a control bus 706, a system management bus, a redundancy bus 708, and a time division multiplex (TDM) bus. The switch fabric 704 is an IP-based transport path for user data throughout the network device 700 implemented by establishing inter-card communications between application cards and line cards. The control bus 706 interconnects the control and management processors within the network device 700. The network device management bus provides management of system functions such as supplying power, monitoring temperatures, board status, data path errors, card resets, and other failover features. The redundancy bus 708 provides transportation of user data and redundancy links in the event of hardware failures. The TDM bus provides support for voice services on the system.

The network device 700 supports at least four types of application cards: a switch processor I/O card (SPIO) 710, a system management card (SMC) 712, a packet service card (PSC) 714, and a packet accelerator card (not shown). Other cards used in the network device 700 include line cards 716 and redundant crossbar cards (RCC) 718. The line cards 716, when loaded in the network device 700, provide input/output connectivity to the network and other devices, as well as redundancy connections. The line cards 716 include interfaces to the network through Ethernet, Fiber Optic, and/or any other communication mediums. The redundant crossbar card (RCC) 718 includes a non-blocking crossbar and connections to each of the cards in the network device 700. This allows a redundant connection to be made through the redundant crossbar card 718 from any one card to any other card in the network device 700. The SPIO card 710 serves as a controller of the network device 700 and is responsible for such things as initializing the network device 700 and loading software configurations onto other cards in the network device 700.

The system management card (SMC) 712 and switch processor card (not shown) are system control and management cards for managing and controlling other cards in the network device 700. The packet accelerator card (PAC) and packet service card (PSC) 714 provide packet processing, context processing capabilities, and forwarding capabilities among other things. The PAC and PSC 714 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device 700 such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The software in the network device 700 can be divided into a series of tasks that perform specific functions. These tasks communicate with each other as needed to share control and data information throughout the network device 700. A task is a software process that performs a specific function related to system control or session processing. Three types of tasks operate within the network device 700 in some embodiments: critical tasks, controller tasks, and manager tasks. The critical tasks control functions that relate to the ability of the network device 700 to process calls such as network device initialization, error detection, and recovery tasks. The controller tasks mask the distributed nature of the software from the user and perform tasks such as monitoring the state of subordinate manager(s), providing for intra-manager communication within the same subsystem, and enabling inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device (e.g., network device 700) include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node (e.g., user equipment 132), the session subsystem can setup a MIPv4 termination and setup a PMIPv6 session towards the core network. A session manager can track the mapping of the sessions and processing to provide the emulation and inter-working between the networks. A database can also be used to map information between the sessions, and store, for example, NAI, HoA, AE information in some embodiments.

Figure 8:
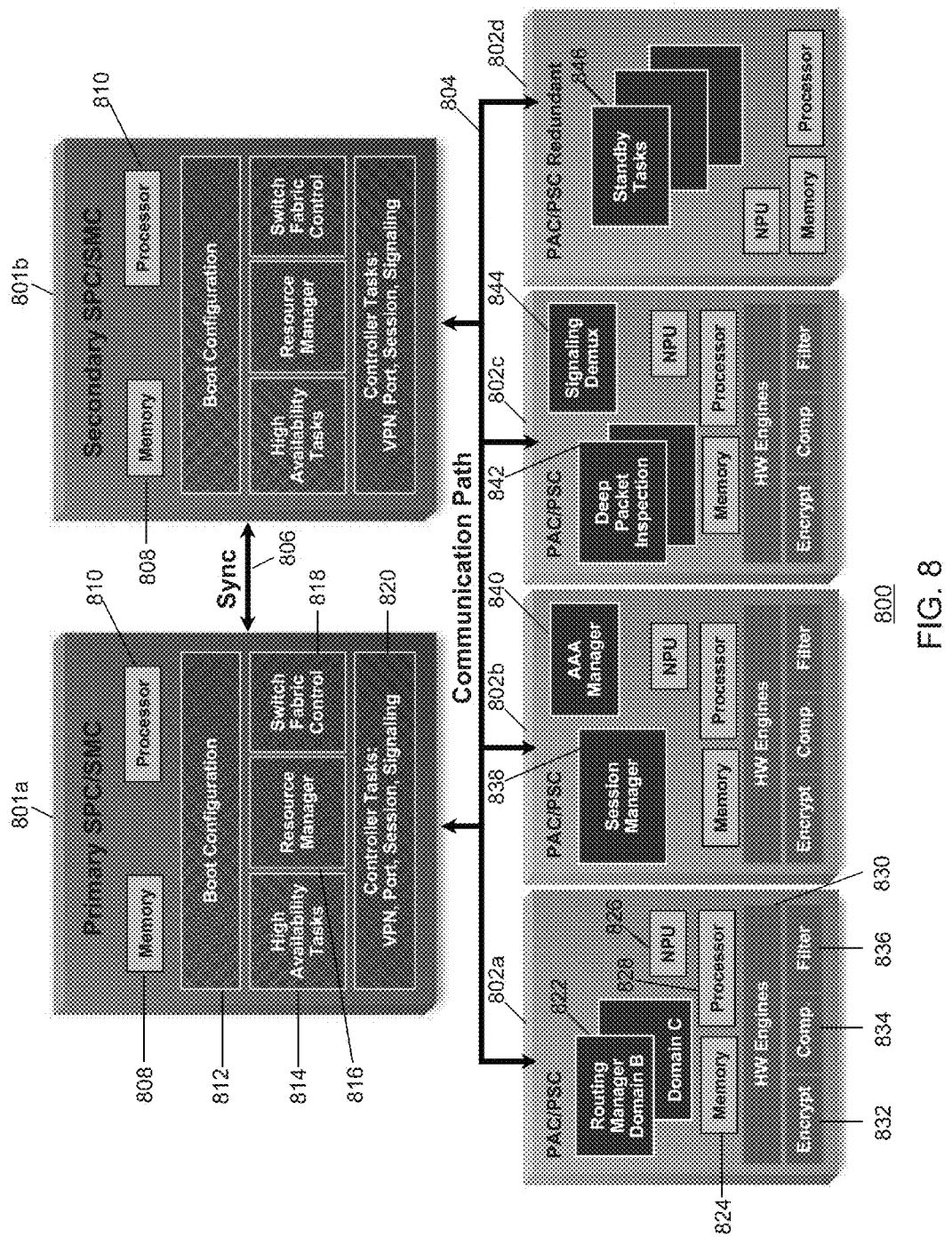
FIG. 8 illustrates a logical view of the software architecture of a network device in accordance with certain embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 8 illustrates a logical view 800 of the software architecture of a network device (e.g., network device 700) in accordance with certain embodiments. As shown, the software and hardware can be distributed within the network device and across different circuit boards, processors, and memory. FIG. 8 includes a primary switch processor card (SPC)/system management card (SMC) 801a, a secondary SPC/SMC 801b, PAC/PSC 802a-802d, a communication path 804, and a synchronization path 806. The primary SPC/SMC 801a and the secondary SPC/SMC 801b each includes a memory 808, a processor 810, a boot configuration 812, high availability tasks 814, resource manager 816, switch fabric control 818, and controller tasks 820.

The SPC/SMC 801 manages and controls the network device including the other cards in the network device. The SPC/SMC 801 can be configured in a primary and secondary arrangement that provides redundancy and failsafe protection. The modules or tasks running on the SPC/SMC 801 are related to network device wide control and management. The boot configuration task 812 includes information for starting up and testing the network device. The network device can also be configured to startup in different configurations and providing different implementations. These can include which functionalities and services are capable of running on the SPC/SMC 801. The high availability task 814 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 801 or a PAC/PSC 802, while some processor intensive tasks can also be performed across multiple PACs/PSCs to utilize multiple CPU resources. Distribution of these tasks is invisible to the user. The switch fabric control 818 controls the communication paths in the network device. The controller tasks module 820 can manage the tasks among the resources of the networks to provide, for example, VPN services, assign ports, and create, delete, and modify sessions for UE 132.

The PAC/PSC 802 is a high-speed processing card that is designed for packet processing and the tasks involved with providing various network functionalities on the network device. The PAC/PSC 802 include a memory 824, a network processing unit (NPU) 826, a processor 828, a hardware engine 830, an encryption component 832, a compression component 834, and a filter component 836. Hardware engines 830 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 802 is capable of supporting multiple contexts. The PAC/PSC 802 is also capable of running a variety of tasks or modules. PAC/PSC 802a provides routing managers 822 with each covering routing of a different domain. PAC/PSC 802b provides a session manager 838 and an AAA manager 840. The session manager 838 manages one or more sessions that correspond to one or more UE 132. A session allows a UE 132 to communicate with the network for voice calls and data. The AAA manager 840 manages accounting, authentication, and authorization with an AAA server in the network. PAC/PSC 802 provides a DPI task 842 and a signaling demux 844. The DPI task 842 provides inspection of packet information beyond layer 4 for use and analysis by the network device. The signaling demux 844 can provide scalability of services in combination with other modules. PAC/PSC 802d provides redundancy through standby tasks 846. Standby tasks 846 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims.

What is claimed is:

1. A method comprising:
   detecting, at a control node, a transition of a user equipment (UE) from a first cell to a second cell;
   in response to detecting the transition of the UE from the first cell to the second cell, determining, by the control node, whether the UE has transitioned from a first charging area to a second charging area, wherein the determining is based on a cell identifier of the second cell and a charging area configuration, wherein the second charging area is determined independently of a tracking area or a routing area;
   in response to determining that the UE has transitioned from the first charging area to the second charging area, providing, by the control node for a policy server, a report indicating that the UE has transitioned to the second charging area;
   detect a transition of the UE from the second cell to a third cell;
   in response to detecting the transition of the UE from the second cell to the third cell, determine whether the UE has transitioned out of the second charging area, wherein the determining is based on a cell identifier of the third cell and the charging area configuration; and
   when it is determined that the UE has not transitioned out of the second charging area, determine not to provide a report for the policy server in association with the transition of the UE from the second cell to the third cell.

2. The method of claim 1, further comprising:
   updating the charging area configuration by at least one of: adding a set of cells forming a new charging area, removing a set of cells forming an existing charging area, adding at least one cell to a set of cells forming an existing charging area, or removing at least one cell from a set of cells forming an existing charging area.

3. The method of claim 1, wherein the charging area configuration applies to a plurality of UEs.

4. The method of claim 1, wherein the charging area configuration is one of a plurality of charging area configurations and each charging area configuration of the plurality of charging area configurations applies to only one UE.

5. The method of claim 1, wherein the charging area configuration comprises a plurality of sets of cells, wherein each set of cells defines a distinct charging area.

6. The method of claim 1, wherein the control node comprises a mobility management entity (MME).

7. The method of claim 1, wherein the policy server includes a policy and charging rules function (PCRF).

8. The method of claim 1, wherein the determining, by the control node, whether the UE has transitioned from a first charging area to a second charging area comprises comparing the cell identifier to a first set of cells of the charging area configuration that form the first charging area to determine whether the second cell is a part of the first set of cells.

9. The method of claim 1, wherein the determining, by the control node, whether the UE has transitioned from a first charging area to a second charging area comprises identifying a second set of cells in the charging area configuration that includes the second cell and determining whether the second set of cells is different from a first set of cells forming the first charging area.

10. A network device comprising:
    a memory to store data; and
    a processor to:
       detect a transition of a user equipment (UE) from a first cell to a second cell;
       in response to detecting the transition of the UE from the first cell to the second cell, determine whether the UE has transitioned from a first charging area to a second charging area, wherein the determining is based on a cell identifier of the second cell and a charging area configuration, wherein the second charging area is determined independently of a tracking area or a routing area;
       in response to determining that the UE has transitioned from the first charging area to the second charging area, providing for a policy server a report indicating that the UE has transitioned to the second charging area;
       detect a transition of the UE from the second cell to a third cell;
       in response to detecting the transition of the UE from the second cell to the third cell, determine whether the UE has transitioned out of the second charging area, wherein the determining is based on a cell identifier of the third cell and the charging area configuration; and
       when it is determined that the UE has not transitioned out of the second charging area, determine not to provide a report for the policy server in association with the transition of the UE from the second cell to the third cell.

11. The network device of claim 10, wherein the charging area configuration applies to a plurality of UEs.

12. The network device of claim 10, wherein the charging area configuration is one of a plurality of charging area configurations and each charging area configuration of the plurality of charging area configurations applies to only one UE.

13. The network device of claim 10, wherein the determining whether the UE has transitioned from a first charging area to a second charging area comprises identifying a second set of cells in the charging area configuration that includes the second cell and determining whether the second set of cells is different from a first set of cells forming the first charging area.

14. A non-transitory computer-readable medium comprising a computer program product, the computer program product comprising computer executable code which, when executed by one or more processors, causes the one or more processors to:
    detect a transition of a user equipment (UE) from a first cell to a second cell;
    in response to detecting the transition of the UE from the first cell to the second cell, determine whether the UE has transitioned from a first charging area to a second charging area, wherein the determining is based on a cell identifier of the second cell and a charging area configuration, wherein the second charging area is determined independently of a tracking area or a routing area;
    in response to determining that the UE has transitioned from the first charging area to the second charging area, providing for a policy server a report indicating that the UE has transitioned to the second charging area;

detect a transition of the UE from the second cell to a third cell;

in response to detecting the transition of the UE from the second cell to the third cell, determine whether the UE has transitioned out of the second charging area, wherein the determining is based on a cell identifier of the third cell and the charging area configuration; and when it is determined that the UE has not transitioned out of the second charging area, determine not to provide a report for the policy server in association with the transition of the UE from the second cell to the third cell.

15. The medium of claim 14, wherein the charging area configuration applies to a plurality of UEs.

16. The medium of claim 14, wherein the charging area configuration is one of a plurality of charging area configurations and each charging area configuration of the plurality of charging area configurations applies to only one UE.

17. The medium of claim 14, the computer executable code which, when executed by the one or more processors, to further cause the one or more processors to:

detect a transition of the UE from the second cell to a third cell;

in response to detecting the transition of the UE from the second cell to the third cell, determine whether the UE has transitioned out of the second charging area, wherein the determining is based on a cell identifier of the third cell and the charging area configuration; and when it is determined that the UE has not transitioned out of the second charging area, determine not to provide a report for the policy server in association with the transition of the UE from the second cell to the third cell.

18. The medium of claim 14, wherein the determining whether the UE has transitioned from a first charging area to a second charging area comprises identifying a second set of cells in the charging area configuration that includes the second cell and determining whether the second set of cells is different from a first set of cells forming the first charging area.

* * * * *